3,483,955
CLUTCH BAND AND METHOD OF MAKING SAME
Sidney L. Schell, South Bend, and Max M. Austin, Mishawaka, Ind.; said Schell assignor to John M. Dodwell, Buchanan, Mich., and said Austin assignor to National-Standard Company, Niles, Mich., a corporation of Delaware
Filed Jan. 18, 1968, Ser. No. 698,760
Int. Cl. F16d *11/06*
U.S. Cl. 192—41                                    9 Claims

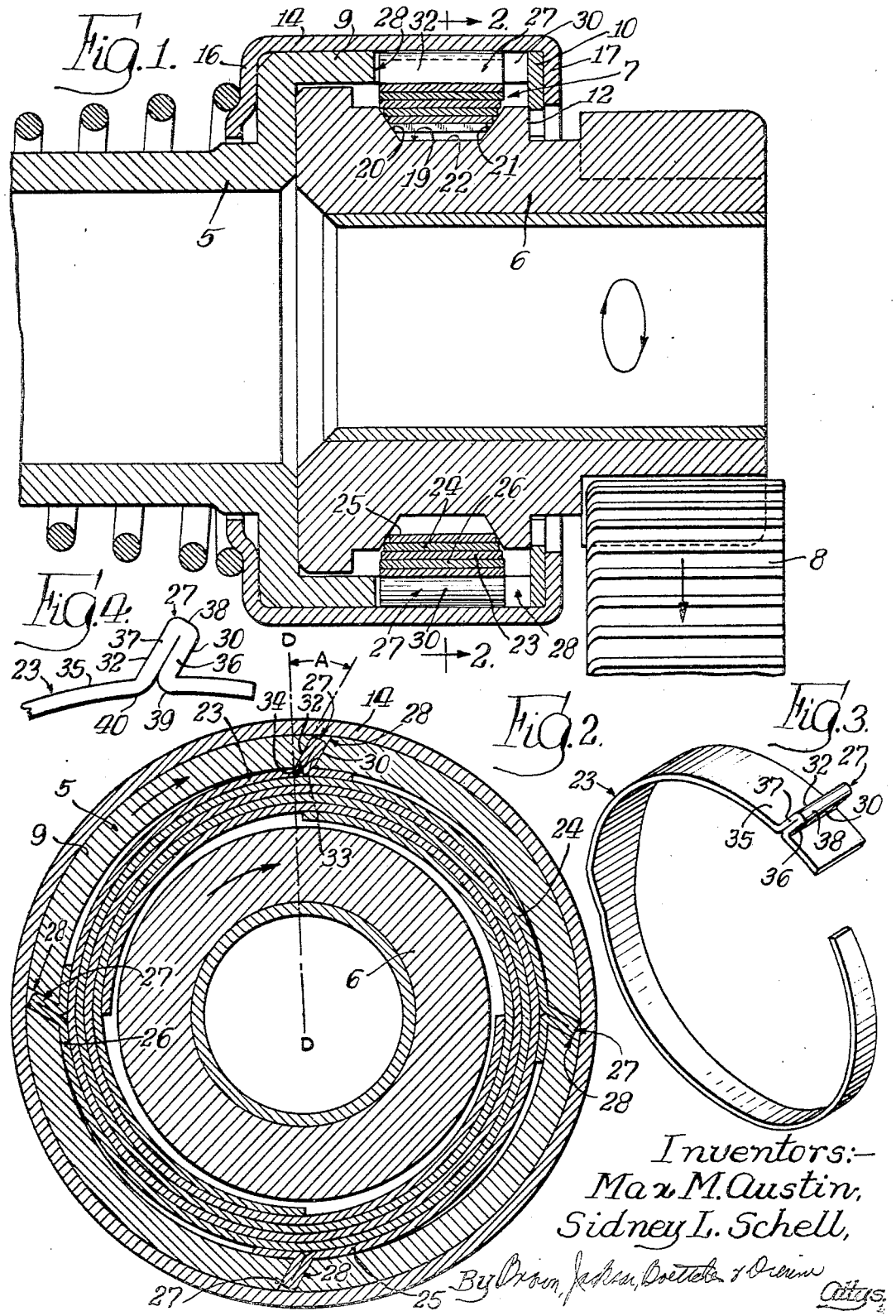

ABSTRACT OF THE DISCLOSURE

A tapered spiral clutch band for an overrunning one-way band clutch in which the clutch band is provided at its wide end with an anchor for anchoring the band to a first clutch member, in which a narrower tapering end portion of the band extends into a V-groove of a second clutch member for engaging the side edges of the band with the side edges of a V-groove, and in which the anchor at the wide end of the band is in the nature of a pleat extending transversely and projecting outwardly of the outer surface of the band formed by outwardly displacing adjacent portions of the clutch band inwardly of the wide end, and disposing the inner surfaces of said adjacent portions into abutting engagement.

---

The present invention relates to clutch bands for overrunning one-way band clutches and method of making such clutch bands.

The clutch band of the present invention has particular utility for the class of band clutch constructions typically shown in United States Patent No. 2,518,453 issued Aug. 15, 1950 to John M. Dodwell. This patent discloses a band type free wheeling clutch embodying drive and driven clutch members, one of which is provided with a V-groove into which the narrow tapered ends of a plurality of interfitting and overlapping band means are disposed, and in which the wide ends of such band means are fixed to the other of such clutch members. The arrangement is such that upon rotation of the drive member in one direction a driven member is driven in the same direction through engagement of the side edges of the narrow tapered ends of the band means with the side walls of the V-groove, and in which, when the driven member rotates at a faster speed than the drive member, the band means permits the driven member to overrun the drive member.

Early in the development of clutches of the above type, a major problem resided in providing the clutch bands with an adequate anchor for the fixed or secured end of the clutch band. Various structural arrangements were proposed for fixing one end of the clutch band fast to one of the clutch parts but many of such known structures soon failed by fracturing of the metal adjacent the fixed end. More recently a satisfactory anchor has been achieved by folding a portion of the metal of the band at the wide end thereof back upon itself to create a projection fitting into a conformably formed pocket in one of the clutch members such as the driving clutch member.

The present invention addresses itself to a clutch band of the class noted embodying a novel anchor integrally formed at the wide end of the band having certain desirable physical characteristics, and which may be fabricated by simple manufacturing procedures.

The tapered spiral clutch band of the present invention embodies an anchor in the nature of a pleat extending transversely and projecting outwardly at the wide end thereof formed by outwardly displacing adjacent portions inwardly of the wide end of the clutch band, and disposing the inner surfaces of such displaced portions into abutting relationship.

In the aforenoted clutch band of the invention, the outwardly displaced adjacent portions of the band may be swaged to bring the abutting inner surfaces thereof in positions to provide for capillary flow of brazing material between such inner surfaces. Further, such swaging of the outwardly displaced adjacent portions of the band provides a smooth maximum size drive face, for the anchor for engagement with the drive face of a conformably formed pocket for the anchor in a clutch drive member. The outer end fold of the abutted displaced adjacent portions of the band may also be swaged to cause flow of metal at the inner ends of the outwardly displaced adjacent portions of the band for added strength at such portions of the band. In fabricating the clutch band as aforenoted a minimum of material is required, close control of manufacturing tolerances are achieved, and heat treatment is easily effected.

The above and other objects and advantages of the invention will appear from the following detailed description of a preferred embodiment of the invention shown in the accompanying drawings in which:

FIGURE 1 is a vertical sectional view through a clutch embodying clutch bands of the present invention;

FIGURE 2 is a detail vertical sectional view taken substantially on the line 2—2 of FIGURE 1 looking in the direction indicated by the arrows;

FIGURE 3 is a perspective view of a clutch band of the present invention; and

FIGURE 4 is an enlarged detail side-elevational view of the anchor end of the clutch band of FIGURE 3.

Referring now to FIGURES 1 and 2 of the drawing, there is shown a clutch having known drive and driven clutch members 5 and 6, respectively, and with which clutch band means, generally indicated at 7 of the present invention have been incorporated.

In the clutch shown in FIGURES 1 and 2, a drive clutch member 5 is in the form of a drive shaft adapted to have connection with a suitable prime mover, and a driven clutch member 6 which, for example, may have a pinion 8 made fast thereto to effect driving of any desired driven member. The drive clutch member 5 has an annular flange 9 at the outer end thereof and within which the inner end of the driven clutch member 6 is arranged in piloting relation. A thrust washer 10 engages the outer end of the annular flange 9 and the end wall 12 of driven clutch member 6 and is retained in position by a housing 14 enclosing the clutch by the radially inwardly extending end flanges 16 and 17.

The driven clutch member 6, as is known in clutches of the class to which this invention relates, is formed with a V-groove 19 defined by opposed end walls 20 and 21 tapering inwardly toward each other and a bottom wall 22 for receiving the band means 7 which, in the embodiment of the invention shown, comprises four tapered bands 23, 24, 25 and 26 of generally spiral configuration, the terminal ends of greatest width having anchors 27 of the present invention thereat and with their narrower free ends extending into the V-groove 19. The bands 23 through 26 preferably are constructed of spring steel stock, and as will be described in greater detail hereinafter, effect a biasing force urging the side edges of the bands into wedging engagement with the walls 20 and 21 of V-groove 19. The anchors 27 fit into pockets 28 conforming in configuration to the anchors 27 and formed by cut-outs in the annular flange 9 of the drive member 5. In the typical clutch shown in FIGURES 1 and 2 there are four such pockets disposed in uniform circumferentially spaced relation in the annular flange to receive the anchors 27 of the four bands 23 through 26.

In that the several clutch bands 23 through 26 are of identical construction, reference hereinafter will be made only to clutch band 23. The anchor 27 of band 23 fits in pocket 28 of the drive clutch member 5 and has a clutch release face 30 at its outer end and a clutch drive face 32 at its inner end which faces 30 and 32 engage end walls 33 and 34, respectively, of the pocket 28.

In the clutch described upon rotation of the drive clutch member 5 in a clockwise direction, as viewed in FIGURE 2 and as indicated by the arrow, the end wall 34 of the pocket 28 engages the drive face 32 of the anchor 27 which effects radial contraction of the band 23 to engage the side edges thereof with the walls 20 and 21 of the V-shaped groove 19 to drive the driven member 6 in a clockwise direction as indicated by the arrow applied to the latter. However, when the driven clutch member 6 overruns the drive clutch member 5, the releasing face 30 by its engagement with the end wall 33 of the pocket 28 effects release of the frictional driving engagement of the side edges of the band 23 with the walls 20 and 21 of the V-groove 19 to thus drivingly disengage the drive and driven clutch members. Thus, in the arrangement of the parts as shown, when the driven clutch member 6 is rotating in the same direction but at a faster speed than the drive clutch member 5, the driven clutch member 6 overruns the drive clutch member 5.

As above noted, the present invention resides in an improved clutch band such as shown at 23 through 26 and reference may now be had to FIGURES 3 and 4 for a detailed description thereof. In FIGURE 3 there is shown a clutch band for example, the band 23 having the anchor 27 at the terminal end thereof of maximum width and which band is curved in generally spiral form as shown in FIGURE 3 for assembly with the drive and driven clutch members 5 and 6 of the clutch.

The anchor 27 is in the nature of a pleat extending transversely and projecting outwardly of the outer surface 35 of the band formed by the outward displacement of adjacent portions 36 and 37 of the clutch band at the wide end thereof and with such adjacent portions 36 and 37 having their inner surfaces in abutting engagement to form a tight pleat. Preferably the adjacent portions 36 and 37 are swaged to dispose the inner surfaces thereof in close relation to create a condition for capillary flow of brazing compound between the inner surfaces of the two portions 36 and 37 to provide the anchor with considerable mechanical strength. In the displacement of the portions 36 and 37, as described, such portions will be connected by a rounded end fold and which as shown in FIGURE 4 has been squared off as by a swaging punch providing the end squared surface 38. This latter swaging operation causes flow of metal at the lower ends 39 and 40 of the portions 36 and 37 to add to the strength of the band at such portions 39 and 40.

The swaging of the adjacent portions 36 and 37 provides the clutch driving and release faces with smooth flat surfaces which, especially with respect to the driving face 32, is of advantage for cooperation with the driving face 34 of the pocket 28 in which the anchor 27 is received.

As will be seen in FIGURES 3 and 4, the anchor 27 in addition to projecting outwardly is angled in a direction to extend toward the wide end of the band 23.

In the fabrication of the anchor 27, as above described, the anchor 27 is preferably disposed so that the drive face 32 thereof lies in a plane at an angle A relative to a respective radial line D—D. In effecting a clutching engagement the engagement of the drive face 34 of the pocket 28 with the last described drive face 32 of the anchor 27 effects, in a clutch engaging operation, of a force component for engaging the sides of the narrow ends of the bands with the sides of the V-groove.

It is preferable in fabricating clutch bands of the present invention to form them from high carbon steel stock of, for example, 1095 or 1075 steel. An appropriate length of such stock is cut from a supply source and then tapered at one terminal end. After tapering of the stock the edges may be coined and provided with a bevel. The anchor 27 is then suitably formed as above described. The band is then wound on a suitable form into a generally spiral configuration as illustrated, for example, to the configuration shown in FIGURE 3. After forming the band into spiral configuration, brazing material is disposed at the abutting faces of the adjacent displaced portions 36 and 37. Typical brazing material may comprise silver solder which has a brazing temperature of about 1200° F. Thereafter the formed clutch band is preferably heat treated at a temperature in a range of about 1400–1500° F., and at which temperature brazing of the brazing material to secure the portions 36 and 37 to each other will occur. Thereafter, the band is quenched in oil at room temperature and after which they may be stressed relieved in a temperature range of about 400°–500° F. After such heat treatment, quenching and stress relieving, the band is preferably accurately shaped to the desired spiral configuration following which the band is heat set at a temperature of about 650–750° F. depending in large part on the hardness desired. A band thus completed may be assembled with other like bands as for example bands 23 through 26 with the other components of FIGURES 1 and 2 of the drawings to provide the clutch there shown.

While a preferred embodiment of the invention has been shown and described it will be understood that various modifications and rearrangements may be made therein without departing from the spirit and scope of the invention.

The invention claimed is:

1. A tapered spiral clutch band for an overrunning one-way band clutch having an anchor at the wide end portion thereof in the nature of a pleat extending transversely and projecting outwardly of the outer surface of the clutch band, and said pleat being formed by outwardly displaced adjacent portions of the clutch band inwardly of the outer end of the wide end portion thereof providing an outer end terminal portion projecting from the pleat to the outer end of the wide end portion of the band.

2. The clutch band of claim 1 in which the inner surfaces of said adjacent portions are disposed in abutting relation and brazed together.

3. The clutch band of claim 1 in which said anchor extends angularly from said outer surface toward the outer end of said wide end portion.

4. The clutch band of claim 2 in which said anchor extends angularly from said outer surface toward the outer end of said wide end portion.

5. The method of forming an anchor at the wide end portion of a tapered clutch band comprising the steps of outwardly displacing adjacent portions of said band inwardly of the outer end of the wide end portion thereof, and positioning the inner surfaces of said outwardly displaced adjacent portions in abutting relation.

6. The method of claim 5 comprising the further step of joining said inner surfaces to each other.

7. The method of claim 6 in which said inner surfaces are joined by brazing.

8. The method of claim 5 characterized by the further step of swaging the outer end of the abutted adjacent portion of said band causing flow of metal at the inner ends of said adjacent portion of said band.

9. The method of claim 5 in which the inner surfaces of said adjacent portions of said band are disposed in abutting relation by a swaging operation.

References Cited

UNITED STATES PATENTS

| | | |
|---|---|---|
| 3,193,067 | 7/1965 | Dodwell. |
| 3,266,131 | 8/1966 | Mallory et al. |
| 3,270,845 | 9/1966 | Dodwell. |

MARK NEWMAN, Primary Examiner

A. D. HERRMANN, Assistant Examiner

U.S. Cl. X.R.

192—81, 107